US007997656B2

(12) United States Patent
Inagaki et al.

(10) Patent No.: US 7,997,656 B2
(45) Date of Patent: Aug. 16, 2011

(54) HOLDING STRUCTURES OF VEHICULAR SEATS FOR HOLDING AN ELECTRIC WIRE MEMBER

(75) Inventors: Yorihisa Inagaki, Toyota (JP); Tomoaki Nagata, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 299 days.

(21) Appl. No.: 12/271,270

(22) Filed: Nov. 14, 2008

(65) Prior Publication Data

US 2009/0146485 A1 Jun. 11, 2009

(30) Foreign Application Priority Data

Dec. 5, 2007 (JP) ................................ 2007-314607

(51) Int. Cl.
*B60N 2/44* (2006.01)
(52) U.S. Cl. .............. 297/452.38; 297/217.3; 297/463.1
(58) Field of Classification Search .............. 297/217.3, 297/452.38, 463.1; 52/287.1, 290; 439/120, 439/209, 216
See application file for complete search history.

(56) References Cited

U.S. PATENT DOCUMENTS

| | | | | |
|---|---|---|---|---|
| 4,530,865 A | * | 7/1985 | Sprenger | 428/35.7 |
| 5,007,682 A | * | 4/1991 | Kuwabara et al. | 297/452.38 |
| 5,228,659 A | * | 7/1993 | Potes et al. | 248/429 |
| 6,011,318 A | * | 1/2000 | Mayoras et al. | 307/10.1 |
| 6,149,241 A | * | 11/2000 | Waku et al. | 297/463.2 |
| 6,333,461 B1 | * | 12/2001 | Marcou et al. | 174/68.3 |
| 6,899,390 B2 | * | 5/2005 | Sanfrod et al. | 297/217.4 |
| 7,172,155 B2 | * | 2/2007 | Feist et al. | 244/118.6 |
| 7,237,846 B1 | * | 7/2007 | Arima | 297/452.38 |
| 2002/0050730 A1 | * | 5/2002 | Kondo et al. | 297/217.3 |

FOREIGN PATENT DOCUMENTS

| | | |
|---|---|---|
| JP | 8-244507 A | 9/1996 |
| JP | 2002-127799 A | 5/2002 |

OTHER PUBLICATIONS

English language Abstract of JP 8-244507 A.
English language Abstract of JP 2002-127799 A.

* cited by examiner

*Primary Examiner* — Peter R. Brown
(74) *Attorney, Agent, or Firm* — Greenblum & Bernstein, P.L.C.

(57) ABSTRACT

A holding structure of a vehicular seat for holding an electric wire member has a shield. The shield is made of a resin and has a main body that can be integrally formed with a bending portion and a cover portion arranged on an inner side of the main body. The holding structure further includes a locking portion capable of locking the cover portion on the inner side of the main body. The holding structure is capable of accommodating a wire member between the cover portion and the main body.

7 Claims, 5 Drawing Sheets

HOLDING STRUCTURES OF VEHICULAR SEATS FOR HOLDING AN ELECTRIC WIRE MEMBER

This application claims priority to Japanese patent application serial number 2007-314607, the contents of which are incorporated herein by reference.

BACKGROUND OF THE INVENTION

1. Field of the Invention

The present invention relates to a holding structure of a vehicular seat for holding an electric wire member arranged in the vehicular seat of a car or the like.

2. Description of the Related Art

There is a case in which various electric equipment and electric wire members are provided at a vehicular seat. The example of the electric equipment is a motor or the like for changing a position, a shape, or the like, of a seat. The electric wire members (harness) are arranged in the vehicular seat for supplying a electric power or an electric signal to the electric equipment. And the electric wire members are held at the seat by a holding structure.

In Japanese Laid-Open Patent Publication No. H08-244507, a holding structure is provided on an edge trim. The edge trim is attached to a downward-directed end portion of a frame of a seat cushion of a vehicular seat. The edge trim has a holding portion with a section having a C-like shape as the holding structure. An electric wire member is pushed to the holding portion to be held by the holding portion. In Japanese Laid-Open Patent Publication No. 2002-127799, the holding structure is provided on a shield (finisher) covering a side face of a seat cushion of a vehicular seat. The shield has a notch as the holding structure. And the notch catches an electric wire member.

However, the holding portion formed at the edge trim receives the electric wire member while being elastically expanded to open. Therefore, there poses a problem that an operation of installing the electric wire member is not easy. Further, there poses a problem that also a diameter of the electric wire member is limited. The notch formed at the shield does not cover the electric wire member, and it does not have a function of protecting the electric wire member. Hence, there is needed a holding structure of a vehicular seat for holding an electric wire member, which is able to easily hold the electric wire member and is able to protect the electric wire member.

SUMMARY OF THE INVENTION

One aspect of the present invention can include a holding structure of a vehicular seat for holding an electric wire member has a shield. The shield is made of a resin and has a main body that can be integrally formed with a bending portion and a cover portion arranged on an inner side of the main body. The holding structure further includes a locking portion capable of locking the cover portion on the inner side of the main body. The holding structure is capable of accommodating the wire member between the cover portion and the main body.

Therefore, by bending the bending portion and locking the cover portion on the inner side of the main body, the wire member can be positioned between the cover portion and the main body. This protects the wire member. Further, a wire member having various diameters can easily be held. Further, the cover portion covers the wire member, and therefore, the wire member can be prevented from being entangled with other members, or damaged by other members. Further, the holding structure is formed at the existing shield, and the bending portion and the cover portion can be formed integrally with the shield main body. This provides for a simple construction which does not need special parts

DETAILED DESCRIPTION OF THE INVENTION

Each of the additional features and teachings disclosed above and below may be utilized separately or in conjunction with other features and teachings to provide improved holding structures of vehicular seats for holding an electric wire member. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
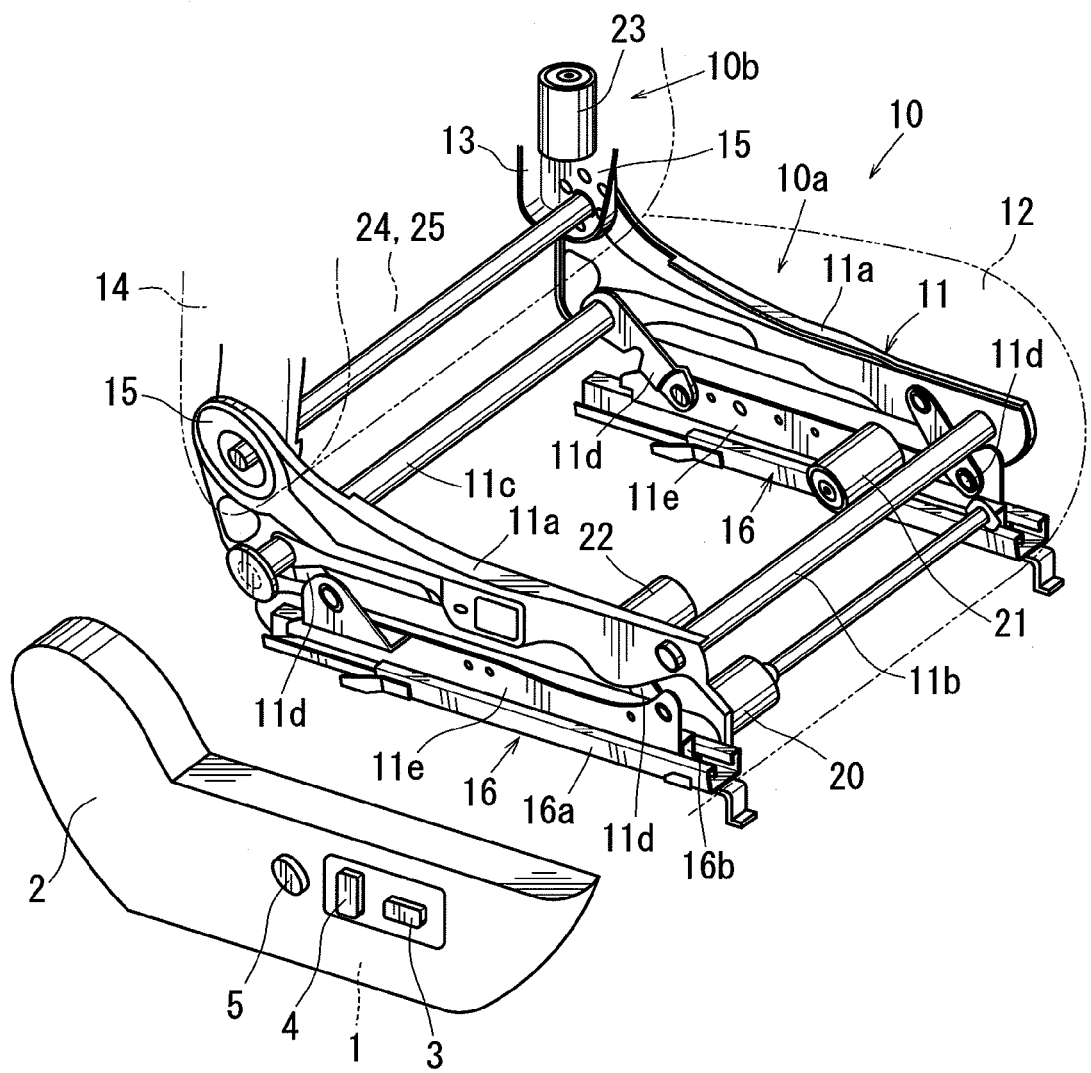
FIG. 1 is a perspective view of a part of a seat and a shield.

As shown in FIG. 1, a vehicular seat 10 is mounted to a floor of a vehicle of a car or the like, and includes a seat cushion 10*a*, a seat back 10*b* and a reclining apparatus 15. The reclining apparatus 15 connects the seat cushion 10*a* and the seat back 10*b* to be able to adjust an angle therebetween. Further, the vehicular seat 10 includes a slide apparatus 16 for supporting the seat 10 slidably relative to the floor, and shield 2 that can be made of a resin material and that is attached to side faces of the seat cushion 10*a*.

As shown in FIG. 1, the seat cushion 10*a* and the seat back 10*b* (illustrated by phantom lines) include frames 11 and 13 and pads 12 and 14 mounted to the frames 11 and 13. The frame 11 of the seat cushion 10*a* includes left and right side frames 11*a*, and front and rear rods 11*b* and 11*c*. The rod 11*b* connects front portions of the left and right side frames 11*a* to reinforce. The rod 11*c* connects rear portions of the left and right side frames 11*a* for reinforcement.

Further, as shown in FIG. 1, the frame 11 includes left and right brackets 11*e* and four links 11*d*. The brackets 11*e* are provided in parallel with the side frames 11*a*. Lower end portions of the brackets 11*e* are attached to the slide apparatuses 16. Each of the links 11*d* is pivotably connected to the side frames 11*a* at an upper end portion thereof and pivotably connected to the brackets 11*e* at a lower end portion thereof. Therefore, the seat cushion 10*a* is moved up and down by moving the four links 11*d*. Further, the two links 11*d* located at front side can be moved up and down so that the seat cushion 10a can be inclined and a front side of the seat cushion 10a can be moved up and down.

As shown in FIG. 1, the slide apparatus 16 includes a lower rail 16a attached to the floor, and an upper rail 16b slidably attached to the lower rail 16a. Further, the bracket 11e is attached to an upper face of the upper rail 16b.

As shown in FIG. 1, the seat 10 is attached with a plurality of electric motors (drive sources) 20 through 23. The electric motors 20 through 23 drive an adjuster (not shown) by a power, and the adjuster adjusts a position of the seat 10 or a shape of the seat 10. For example, the adjuster adjusts a front and rear position of the seat 10, an up and down position of the seat cushion 10a, an up and down position of the front portion of the seat cushion 10a, an angle of the seat back 10b relative to the seat cushion 10a, a front and rear position of a portion of the seat back 10b disposed on a back side of the lumbar of a passenger (by a lumbar support) or the like.

Figure 3:
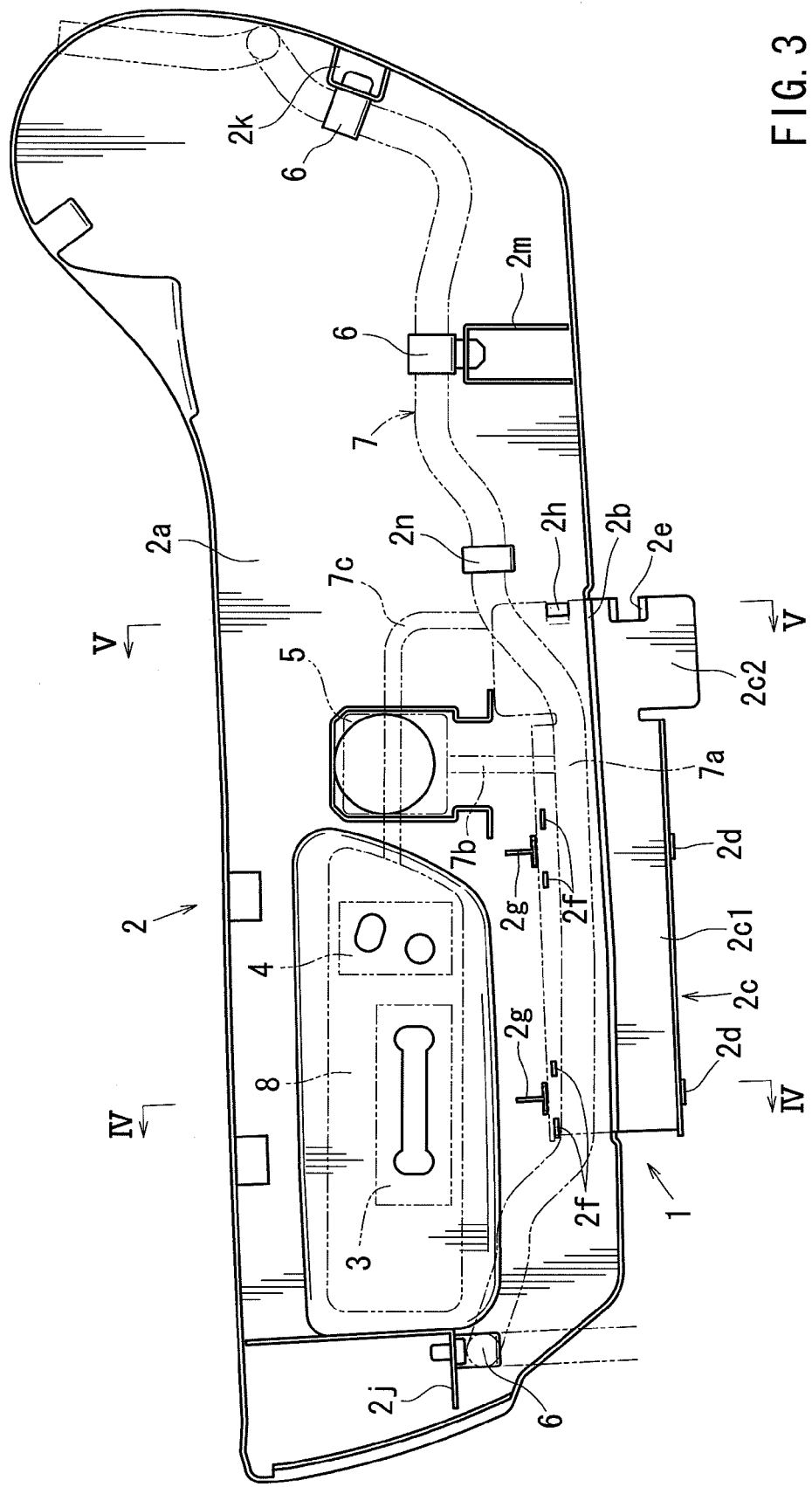
FIG. 3 is a front view of the shield.

The electric motors 20 through 23 are operated by switches 3 through 5 shown in FIGS. 1 and 3 and the switches 3 through 5 are mounted to the shield 2. The switch 3 can initiate, for example, adjustment of the front and rear position of the seat 10, and the switch 4 can initiate adjustment of a height of the seat 10. The switch 5 can initiate adjustment of the lumbar support. An inner side of the shield 2 is provided with an electric base 8, and the switches 3 and 4 are attached to the electric base 8.

Figure 2:
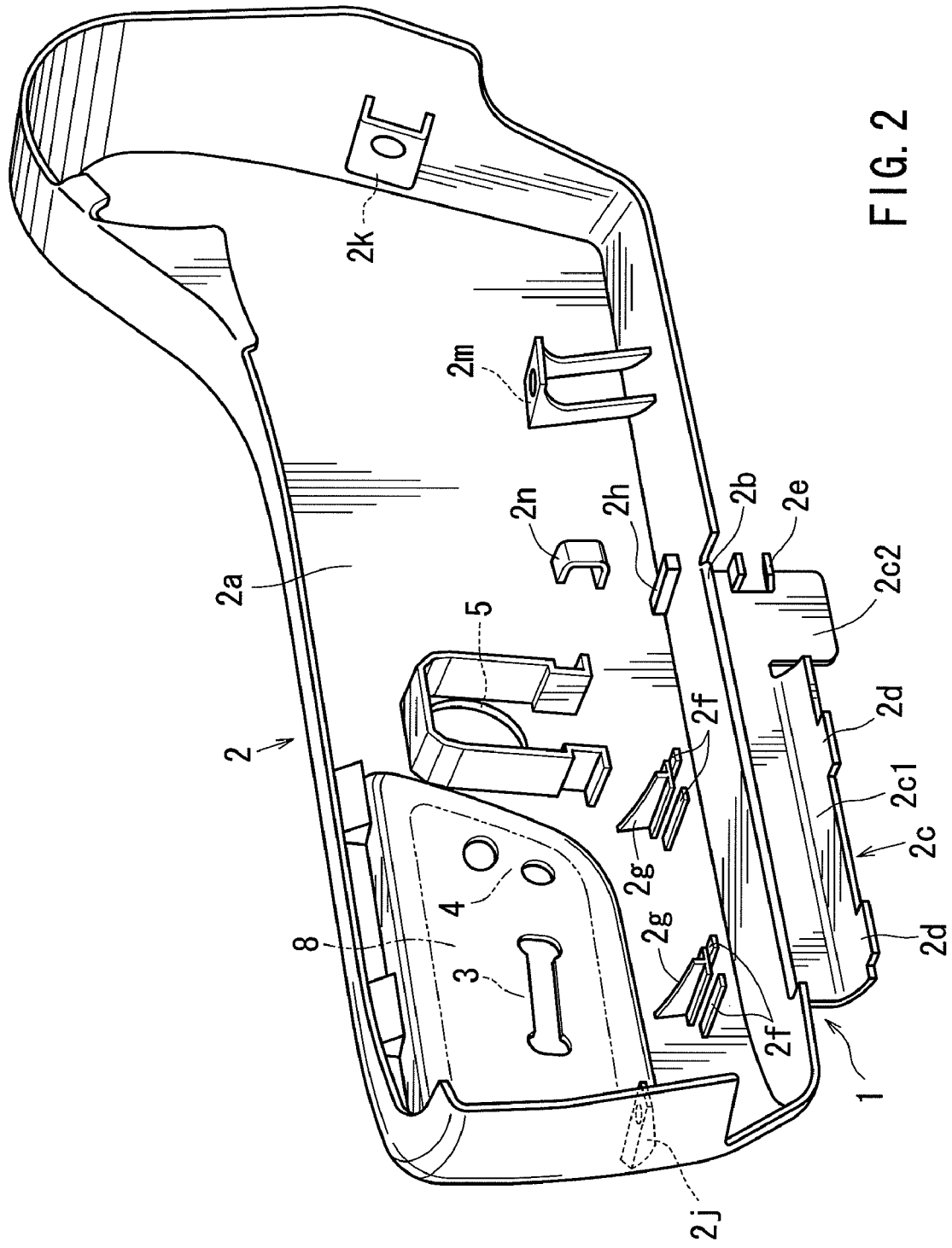
FIG. 2 is a perspective view of the shield.

As shown in FIGS. 1 and 2, the shield 2 covers and conceals a side face constituting a portion of an outer peripheral face of the seat cushion 10a by being attached to a side face of the side frame 11a. The shield 2 is formed with a holding structure 1 for holding an electric wire member (harness) 7 and engage-to-attach portions 2j, 2k, 2m and 2n for engaging to attach the electric wire member 7.

Figure 4:
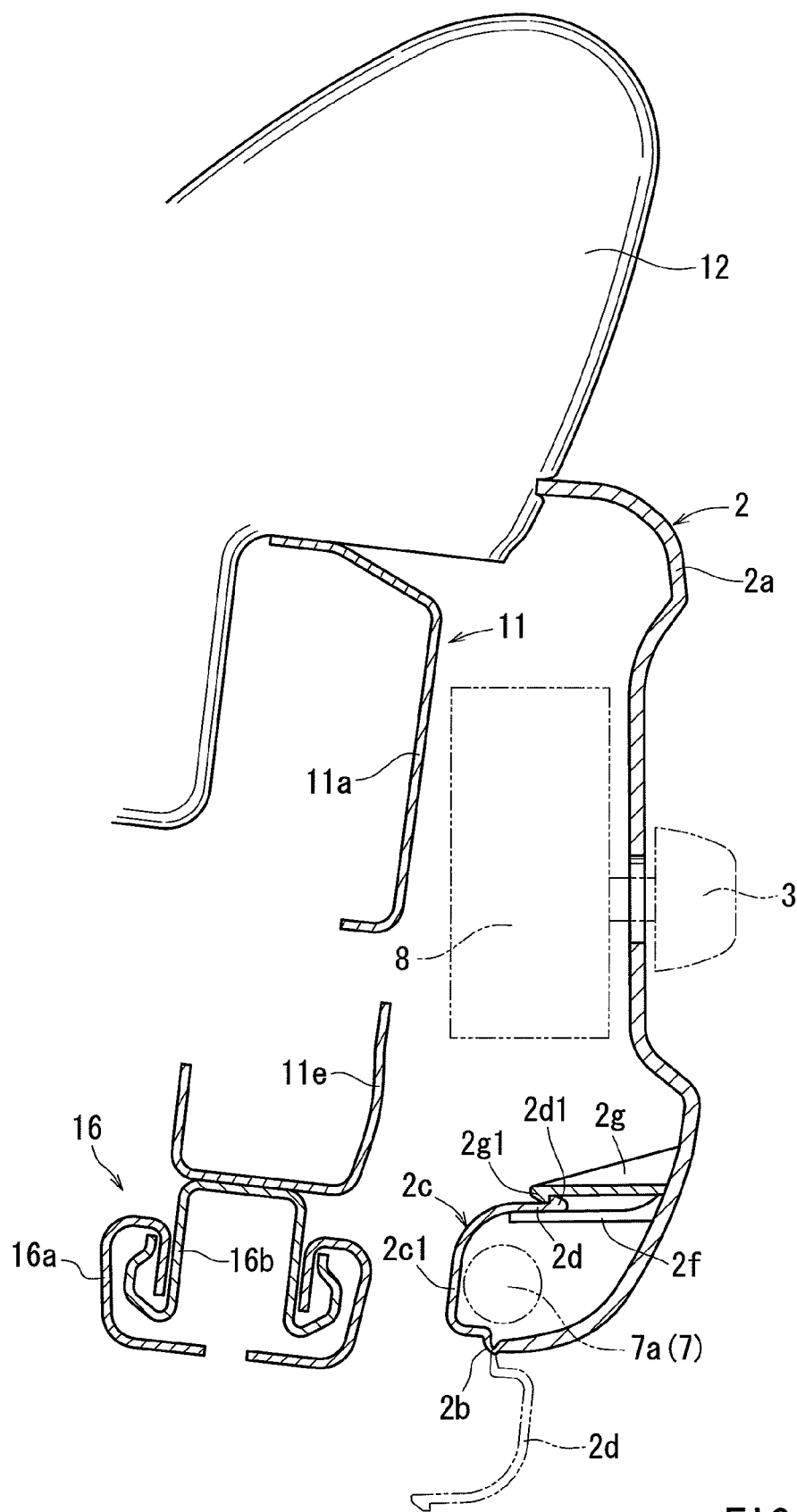
FIG. 4 is a cross-sectional view of a part of the seat and a slide apparatus, corresponding to a cross-sectional view taken along line IV-IV in FIG. 3.

As shown in FIGS. 2 through 4, the holding structure 1 includes a bending portion 2b, a cover portion 2c and locking portions 2d, 2e and 2g. The bending portion 2b is formed along a portion of a lower end edge of a shield main body 2a. The bending portion 2b is formed integrally with the shield main body 2a and can function as an integral hinge for the cover portion 2c. A wall thickness of the bending portion 2b is thinner than those of the shield main body 2a and the cover portion 2c. This allows the bending portion 2b to more easily deform.

The cover portion 2c is formed to be continuous to the bending portion 2b. The cover portion 2c is provided in parallel with an inner side of the shield main body 2a by bending the bending portion 2b, and covers an inner side face of the shield main body 2a. A first cover portion 2c1 and a second cover portion 2c2 can integrally extended from cover portion 2c. A tip end portion of the first cover portion 2c1 is bent, and the second cover portion 2c2 is contiguous to the first cover portion 2c1 and has a rectangular shape.

As shown in FIGS. 2 through 4, a tip end of the first cover portion 2c1 includes locking portions 2d. The locking portions 2g are formed at an inner side face of the shield main body 2a in correspondence with locking portions 2d. The locking portions 2d and 2g respectively include claws 2d1 and 2g1 expanded to counter sides and the claws 2d1 and 2g1 are locked by being elastically deformed. At positions on both sides of the locking portion 2g, lock reinforcing portions 2f project from the inner side face of the shield main body 2a. The lock reinforcing portion 2f prevents the claw 2d1 from being detached from the claw 2g1 by being installed on a lower side of the tip end portion of the first cover portion 2c1.

Figure 5:
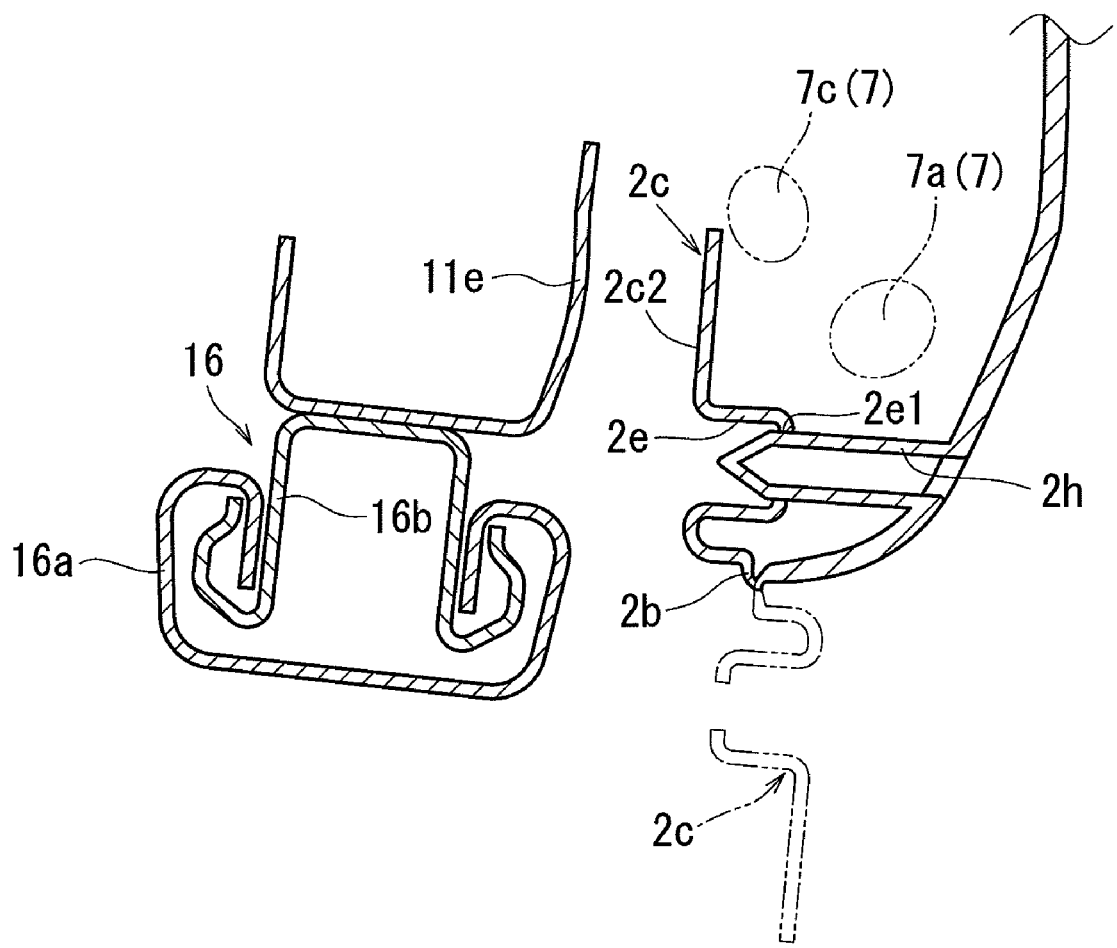
FIG. 5 is a cross-sectional view of the part of the seat and the slide apparatus, corresponding to a cross-sectional view taken along line V-V in FIG. 3.

As shown in FIGS. 2 and 5, a base end portion of the second cover portion 2c2 is formed with the locking portion 2e. A locking portion 2h is formed at the inner side face of the shield main body 2a in correspondence with the locking portion 2e. The locking portion 2e includes an opening portion 2e1 to which a front end of the locking portion 2h is inserted and elastically holds the locking portion 2h by being elastically expanded to open.

As shown in FIGS. 2 and 3, the inner side face of the shield 2 is formed with the engage-to-attach portions 2j, 2k, 2m, 2n for engaging to attach the electric wire member 7. The engage-to-attach portions 2j, 2k, 2m, 2n are formed at a front side portion and a rear side portion of the shield main body 2a, and located in front of or posterior to the cover portion 2c. And they are disposed on an upper side of the cover portion 2c. The engage-to-attach portions 2j, 2k, 2m can include clips 6 and the electric wire member 7 is engaged to attach to the side of the shield 2 by the clips 6. The electric wire member 7 is inserted to the engage-to-attach portion 2n, thereby, the electric wire member 7 is engaged to attach to the side of the shield 2.

As shown in FIGS. 3 through 5, the electric wire member 7 includes a main wire portion 7a arranged a lower side or a side face of the seat cushion 10a. End portions of the main wire portion 7a are attached with connectors (not shown). Further, one of the connectors is arranged at a center on a front side of the seat 10 and is connected to the electric wire member electrically connected to a battery mounted to the vehicle. A middle of the main wire portion 7a is arranged along the shield main body 2a and is engaged to attach to the shield 2 by the engage-to-attach portions 2j, 2k, 2m, 2n.

As shown in FIGS. 3 through 5, the electric wire member 7 includes branch wire portions 7b and 7c branched from the main wire portion 7a. The branch portions between the main wire portion 7a and the branch wire portions 7b and 7c, and a part of the main wire portion 7a at vicinities of the branch portions are held by the holding structure 1. Those positions are covered and held in an interval between the cover portion 2c and the shield main body 2a by bending the bending portion 2b. Further, the branch wire portion 7b branches from the main wire portion 7a at vicinities of the locking portions 2d and 2g and connected to the switch 5. The branch wire 7c is led to an upper side of the second cover portion 2c2 and connected to the electric base 8.

As described above, the shield 2 is integrally formed with the bending portion 2b, the cover portion 2c and the locking portions 2d, 2e, 2g and 2h. Further, the cover portion 2c and the shield main body 2a are constructed form an area to hold the electric wire member 7 between them.

Therefore, by bending the bending portion 2b and locking the cover portion 2c on the inner side of the shield main body 2a, the electric wire member 7 can be held at the interval between the cover portion 2c and the shield main body 2a. Thus the electric wire member 7 can easily be held. Further, the electric wire members 7 having various diameters can easily be held. Further, the cover portion 2c covers the electric wire member 7, and therefore, the electric wire member 7 can be prevented from being entangled with other members (for example, slide apparatus 16), or damaged by other member. Further, the holding structure 1 is formed at the existing shield 2, and the bending portion 2b and the cover portion 2c are formed integrally with the shield main body 2a. Therefore, there is constructed a constitution which does not need a special part and in which a number of parts is small. Also this configuration is easy to construct in an integrated fashion.

Further, as shown in FIG. 4, the bending portion 2b is formed by a wall thinner than those of the shield main body 2a and the cover portion 2c. Therefore, the bending portion 2b can be more easily deformed.

Further, as shown in FIG. 2, the bending portion 2b is formed along a lower end edge of the shield main body 2a, and the cover portion 2c covers an inner side face of a lower side portion of the shield main body 2a. Further, the shield main body 2a is formed with the engage-to-attach portions 2j, 2k for engaging to attach the electric wire member 7 at a front upper position and a rear upper position comparing a position of the cover portion 2c. Therefore, the electric wire member 7 is hung down between the engage-to-attach portions 2j, 2k and the hung-down portion is covered by the cover portion 2c. Therefore, a portion of the electric wire member 7 this normally is easy to become entangled with other members by being hung down can be protected by the cover portion 2c and the bending portion 2b.

Further, as shown in FIG. 3, the electric wire member 7 includes the main wire portion 7a covered by the cover portion 2c, and the branch wire portions 7b and 7c branched from the main wire portion 7a and connected to the electric equipment (switches 3 through 5, electric base 8) provided at the shield main body 2a at a vicinity of the cover portion 2c. Further, at a vicinity of a branch of the main wire portion 7a and the branch wire portion 7b, the locking portion 2g is positioned between the shield main body 2a and the cover portion 2c. This area is susceptible to being rocked by vibration and the like. Therefore, a portion at a vicinity of the branch of the main wire portion 7a and the branch wire portion 7b can be prevented from being rocked or moved because of the locking portions 2d, 2g. Therefore, rocking of the branch vicinity portion can be reduced, and the electric wire member 7 can firmly be prevented from being entangled with other members (for example, slide apparatus 16).

Further, the electric wire member 7 includes the main wire portion 7a and the branch wire portions 7b and 7c, and branch portions thereof are covered by the cover portion 2c. Therefore, the branch portions (which are easy to be rocked by a vibration or the like) are covered by the cover portion 2c. Therefore, the electric wire member 7 can firmly be prevented from being entangled with other members. Further, the locking portions 2d, 2e, 2g are constructed by a constitution of elastically locking the cover portion 2c to the inner side of the shield main body 2a. Therefore, the constitution is excellent also in maintenance performance.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

(1) For example, in FIG. 1 the shield 2 is a member covering one side portion of the seat cushion 10a. However, there may be constituted a configuration including a shield covering the front portion of the seat cushion 10a, or a shield covering a vicinity of a portion of connecting the seat cushion 10a and the seat back 10b, or a shield covering a side portion of the seat back 10b or the like, and forming a holding structure for holding the electric wire member at the shield.

(2) In FIG. 2 the cover portion 2c is connected by the bending portion 2b formed at a lower end portion of the shield main body 2a. However, there may be constituted a configuration of connecting the cover portion by bending portions formed at an upper end portion, or a front end portion, or a rear end portion of the shield main body 2a.

This invention claims:

1. A holding structure of a vehicular seat that holds an electric wire member comprising:
a shield made of a resin covering a portion of an outer peripheral face of the vehicular seat,
wherein the shield integrally includes:
a bending portion at an end portion of a shield main body,
a cover portion positioned on an inner side of the shield main body configured to be folded at the bending portion, and
a locking portion capable of locking the cover portion on the inner side of the shield main body, wherein
the electric wire member is capable of being held between the cover portion and the shield main body, and wherein
the shield main body is formed with an engage-to-attach portion that protrudes from the inner side of the shield main body towards the outer peripheral face of the vehicular seat for engaging the electric wire member at a front upper position and a rear upper position relative to a position of the cover portion.

2. The holding structure of the vehicular seat for holding the electric wire member as in claim 1, wherein a thickness of the bending portion is smaller than a thickness of the shield main body and the cover portion.

3. The holding structure of the vehicular seat for holding the electric wire member as in claim 1, wherein:
the bending portion is formed along a lower end side of the shield main body, and
the cover portion covers an inner side face of the lower side portion of the shield main body.

4. The holding structure of the vehicular seat for holding the electric wire member as in claim 1, wherein:
the electric wire member includes a main wire portion covered by the cover portion, and a branch wire portion extending from the main wire portion and connected to electric equipment provided at the shield main body proximate the cover portion, and
the locking portion is positioned between the shield main body and the cover portion at the position where the branch wire portion extends from the main wire portion.

5. A holding structure of a vehicular seat comprising:
a shield made of a resin,
wherein the shield includes:
a main body,
a cover portion, wherein the main body and the cover portion are movably connected by a bending portion, and
a locking portion capable of locking the cover portion on an inner side of the main body,
wherein an area between the cover portion and the main body is capable of accommodating a wire member, and
wherein the main body includes an engage-to-attach portion that protrudes from the inner side of the main body towards the vehicular seat for holding the wire member at a front upper position and a rear upper position of the main body relative to the cover portion.

6. The holding structure of the vehicular seat as in claim 5, wherein the bending portion has a smaller thickness than a thickness of the main body and a thickness of the cover portion.

7. The holding structure of the vehicular seat as in claim 5, wherein the wire member is branched, and wherein the locking portion is positioned proximate the branched position.

* * * * *